Sept. 2, 1924.
R. C. STONE
1,507,008
VEHICLE DUMPING APPARATUS
Filed March 3, 1920  2 Sheets-Sheet 1
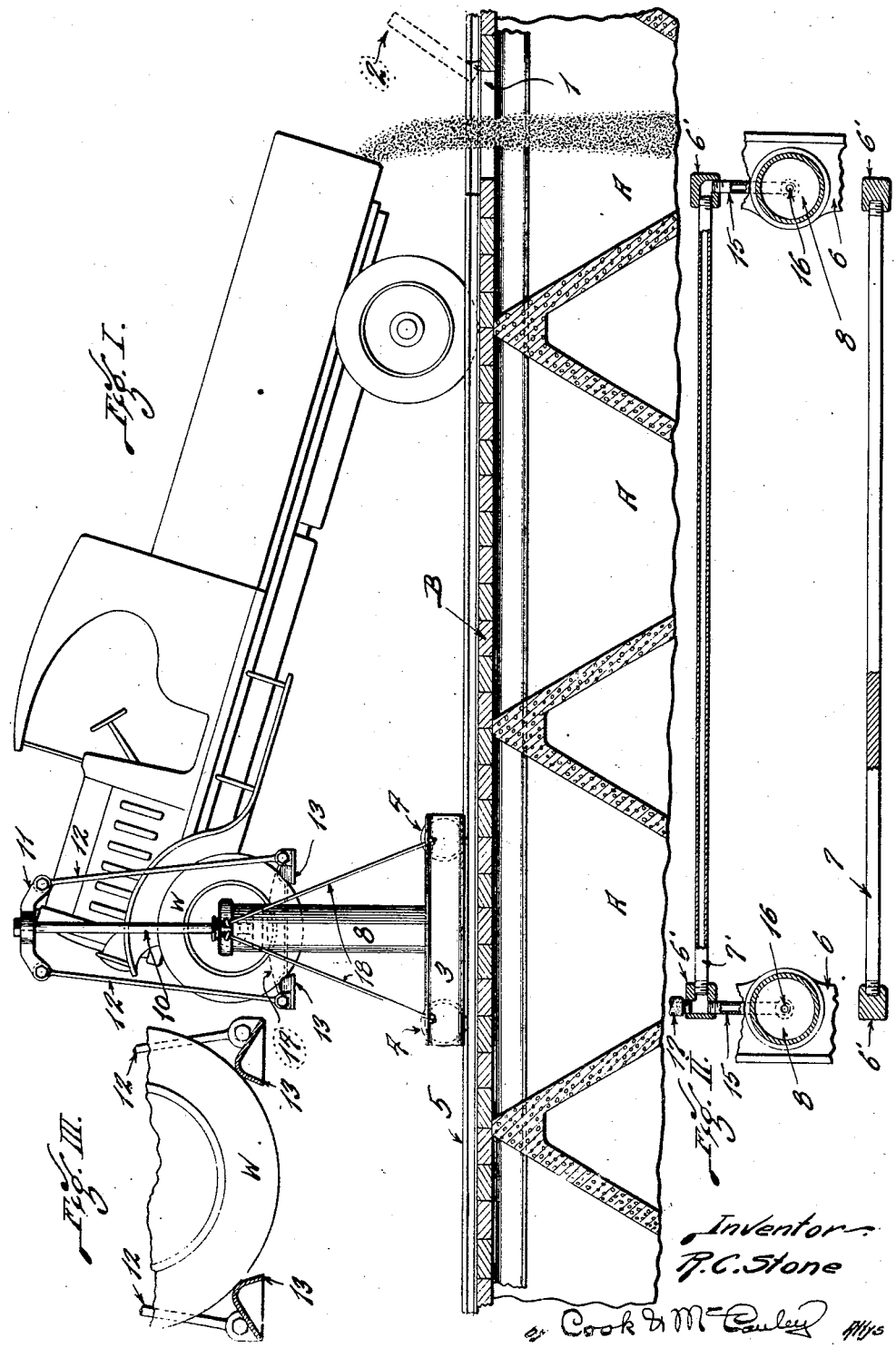
Inventor
R.C.Stone
by Cook & McCauley Attys

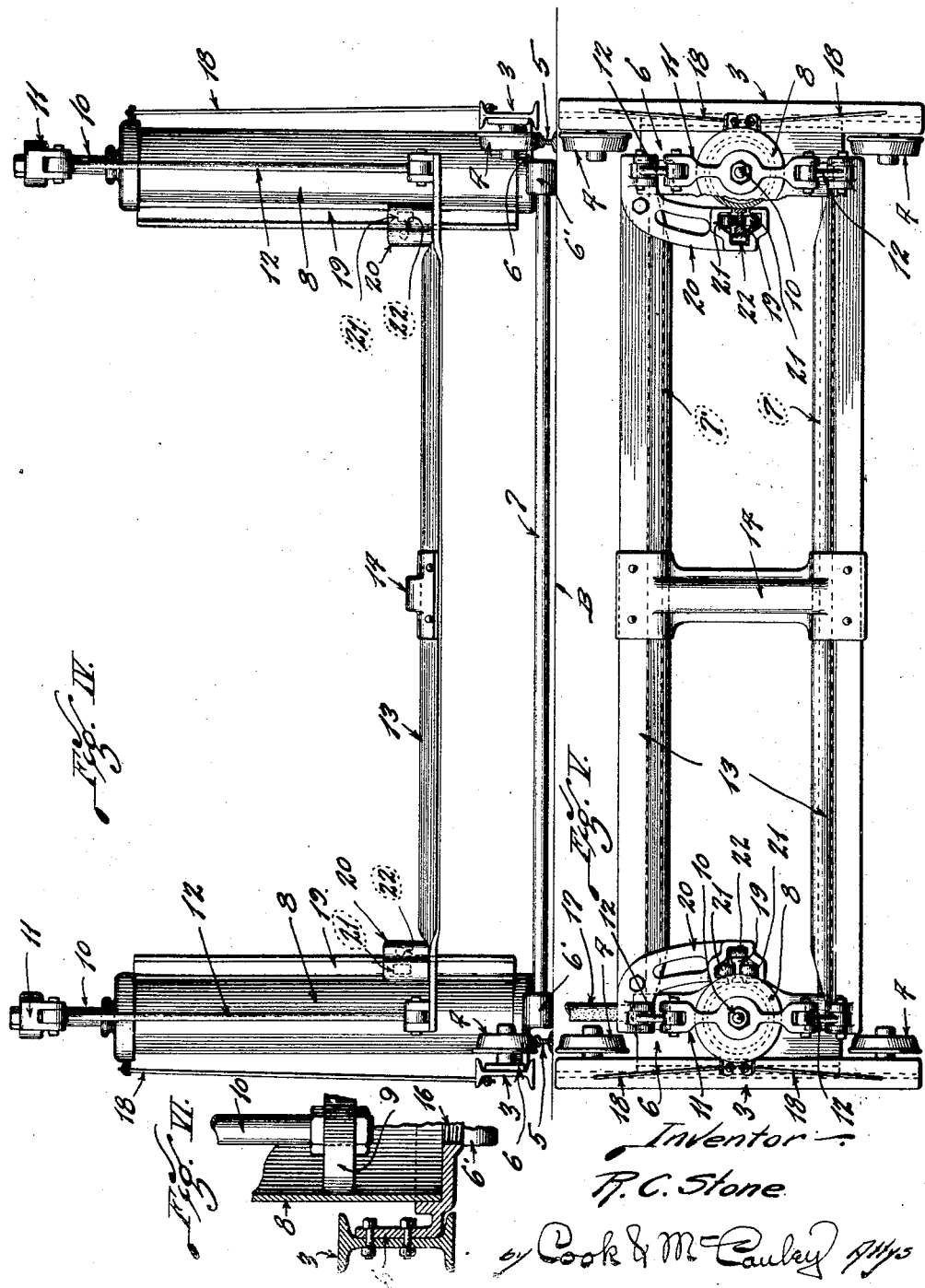

Patented Sept. 2, 1924.

1,507,008

UNITED STATES PATENT OFFICE.

RICHARD C. STONE, OF ST. LOUIS, MISSOURI.

VEHICLE DUMPING APPARATUS.

Application filed March 3, 1920. Serial No. 363,362.

*To all whom it may concern:*

Be it known that I, RICHARD C. STONE, a citizen of the United States of America, a resident of the city of St. Louis, in the State of Missouri, have invented certain new and useful Improvements in Vehicle Dumping Apparatus, of which the following is a full, clear, and exact description, reference being had to the accompanying drawings, forming a part of this specification.

My invention relates to improvements in vehicle dumping apparatus adapted to tilt motor trucks, horse-drawn wagons and other vehicles for the purpose of unloading their contents. The new apparatus is especially adapted for use in grain elevators where it is desirable to dump the grain into different bins, or the like, located beneath a driveway. However, it is to be understood that the invention is not in any way limited to such use.

Prior to this invention, grain elevators were usually provided with tilting beams, or logs, forming tracks for the vehicle to be unloaded, such beams being movable from positions flush with the driveway to inclined positions wherein they support the vehicle in an inclined position to discharge its contents. These ordinary tilting beams are permanently located at a point adjacent to the bin below the driveway, and if the vehicles are to discharge directly into different bins, it is necessary to use a separate dumping apparatus for each bin. Furthermore, these old dumping apparatus occupy space below the driveway that could be advantageously used for other purposes.

One of the objects of the present invention is to produce a portable dumping apparatus movable over the driveway to many different locations where it can be used to unload the vehicles thereby providing a single dumping apparatus whereby vehicles may be unloaded at many different bins, or sinks.

A further object is to produce a highly efficient apparatus of this kind having its various elements combined with each other to very effectively obtain the desired results.

It will also be noted that a portable unloading apparatus of this kind can be located entirely above the driveway, and that it need not occupy any space which could be conveniently used for bins, or the like, below the driveway.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a side elevation, partly in section, illustrating a dumping apparatus embodying the features of this invention, and also showing a number of bins located below the driveway, together with a vehicle discharging its contents into one of the bins.

Fig. II is a fragmentary horizontal section, showing the means for connecting the side members of a carriage which supports a hoisting device, and also showing a means for transmitting fluid under pressure to the hoisting device.

Fig. III is a detail view illustrating the vertically movable seats adapted to receive the front wheels of the vehicle to be unloaded.

Fig. IV is an elevation of the dumping apparatus.

Fig. V is a top or plan view of the apparatus, one of the vertical guides being shown in section.

Fig. VI is a fragmentary view illustrating one of the side members of the carriage, and a portion of the hoisting device supported thereby.

A designates bins, or sinks, beneath a floor or driveway B, each bin having an inlet opening 1 adapted to be closed by a door 2 shown by dotted lines in Fig. I.

To illustrate a suitable portable hoisting device, I have shown a carriage comprising horizontal side members 3 provided with wheels 4 supported on horizontal tracks 5, angular webs 6 extending from the side members 3, and horizontal rods 7 and 7' connecting said side members 3, the ends of said rods being secured in lugs 6' depending from the webs 6. The side members 3 of the wheeled carriage are thus securely connected by the rods 7 and 7' thus forming a carriage frame which preferably lies very close to the floor, or driveway B.

As an illustration of a suitable hoisting device I have shown vertical cylinders 8 supported by the angular webs 6 which form part of the carriage, each cylinder being provided with a piston 9 (Fig. VI) and a piston rod 10. Arms 11 are attached to the upper ends of the piston rods. Hanger rods 12, depending from the arms 11, are connected at their lower ends to horizontally disposed wheel-seats 13 which extend from one side of the carriage to the other, said wheel-seats 13 being in the form of parallel bars or beams arranged at a right angle to the track of the carriage, and separated from each other as shown in Figs. I and III to provide a depression for the front wheels W of the vehicle to be unloaded. 14 designates a connecting member having its ends secured to the middle portions of the wheel-seats 13.

From the foregoing it will be understood that the wheel-seats 13 are connected to the piston rods 10, and that said wheel-seats will rise and fall in response to corresponding movements of the piston in the cylinders 8. In Fig. II I have shown a means for transmitting fluid under pressure, preferably compressed air, to the cylinders 8. Two of the lugs 6' may be hollow, as shown in Fig. II and the connecting member 7' may be in the form of a hollow rod providing for the transmission of compressed air from one of said hollow lugs to the other. 15 designates air conducting pipes whereby the hollow lugs are placed in communication with inlet ports 16 at the bottom of cylinders 8, and 17 designates a flexible air supply hose connected to one of the hollow lugs 6'. The air supply hose 17 may be very long to permit movement of the portable dumping device without disconnecting same from the supply of compressed air. Any suitable means may be employed to control the compressed air. The upper portions of the cylinders 8 are connected to the side members 3 of the carriage by means of inclined rods 18.

19 designates vertical guides secured to the cylinders 8, and 20 designates arms extending from one of the wheel-seats 13 and cooperating with the guides 19. One end of each arm 20 is rigidly attached to a wheel-seat 13 (Fig. V) and the opposite end embraces a guide 19. The guides 19 may be in the form of I beams, as shown in Figs. IV and V. Anti-friction rollers 21, carried by arms 20 extend between the flanges of guides 19 and engage the webs of said guide. Rollers 22, also carried by arms 20, engage the outer faces of flanges on the I-shaped guides 19. By referring to Figs. IV and V, it will be observed that the vertical guides 19 form part of the side frames of the wheeled carriage, and that these guides 19 are connected together through the medium of wheel-seats 13 and arms 20. If a thrust, in any horizontal direction, is imparted to the wheel-seats 13 while said seats are moving vertically, the anti-friction rollers 21 and 22 will cooperate with guides 19 to prevent undue friction.

Since it is unnecessary to locate any of the elements of the dumping apparatus at points below the floor or driveway B (Fig. I) all of the space below the driveway may be used for some other purpose. It is frequently very desirable to locate a number of shallow bins A very close to each other as shown in Fig. I, and this can be done in an elevator equipped with the new dumping apparatus.

A single apparatus of this kind may be easily moved from one location to another for the purpose of unloading the vehicle at many different bins. The tracks 5 and the side members of the carriage are separated to provide a driveway for the vehicles. When the wheel-seats 13 occupy their lowermost positions, they cover the connecting members 7 and 7', so as to form bridges over said connecting members, and the vehicles may be driven over the wheel-seats 13. When a vehicle is to be unloaded, its front portion lies between the side members of the hoisting device carriage, and the front wheels W of the vehicle (Figs. I and III) rest upon the wheel-seats 13. Owing to the manner in which these wheel-seats are formed the wheels are securely held thereon without liability of accidental displacement. After the front wheels of the vehicle have been positioned on the wheel-seats, said seats may be elevated a slight distance to clear the driveway, and thereafter, the vehicle may be driven by its own power to accurately locate the rear end of the vehicle body at the desired position above the selected inlet opening 1. While the vehicle is being adjusted, its front wheels W are securely held by the wheel-seats 13, so the hoisting device carriage will move with the vehicle. This is an advantage in accurately locating the vehicle and dumping apparatus in the most desirable positions for dumping, and it will be readily understood that the vehicle itself may be used as a means for moving the entire hoisting apparatus from one point to another, or from one dumping position to another. If the vehicle is a motor truck, the rear wheels thereof would be driven by the motor to propel both the vehicle and the hoisting apparatus, and if the vehicle is drawn by horses, the latter could be used in moving both the vehicle and dumping apparatus.

After the vehicle has been properly located in the desired dumping position, the hoisting device is operated to elevate the wheel-seats 13, thereby lifting the front portion of the vehicle to discharge its contents at the rear as shown in Fig. I. At this time the brakes may be applied to the rear wheels of the vehicle. It will be interesting to observe a peculiar action which occurs during the upward and downward movements of the wheel-seats 13. The rear wheels of the vehicle being prevented from slipping on the driveway, the front wheels will rise or fall in an arc of a circle the center of which may be considered as the center of the rear wheels. A vertical movement is transmitted to the hoisting device, so as to lift the wheel-seats 13, and during this movement the cylinders 8 and piston rods 10 remain in vertical positions perpendicular to the driveway. However, the front wheels of the vehicle rise in an arc of a circle, and as a consequence the hoisting device carriage is shifted horizontally on the tracks 5 during the dumping operations. The power is very effectively transmitted from the hoisting device in vertical lines, but the entire hoisting device is shifted horizontally to compensate for the arcuate movement of the front portion of the vehicle. During such displacement of the hoisting device, the anti-friction rolls 21 (Figs. IV and V) cooperate with the vertical guide members 19 to transmit the horizontal movements to the hoisting device carriage, said carriage being moved horizontally in response to vertical movements of the hoisting device when the latter is associated with the vehicle as shown in Fig. I.

Although the vehicle is tilted during the dumping operation, it is not placed on an inclined plane and it does not tend to move backwardly, or downwardly. The wheel-seats 13 positively prevent accidental slippage of the front wheels W, and if desired the rear wheels of the vehicle may be easily held by the brakes or by some obstruction in the driveway. However, the dumping operation does not tend to move the vehicle on the driveway.

It is an advantage, in a grain elevator to use a number of temporary storage bins, or sinks A, wherein different grades of grain or different kinds of grain may be conveniently dumped for temporary storage and thereafter elevated to the main storage bins, it being unnecessary to operate the main elevator at frequent intervals for the purpose of emptying the temporary storage bins. Heretofore, the practice has been to employ a separate dumping apparatus for each bin, or sink, and as a consequence it was not economical to have a very large number of bins, or sinks, so it frequently became necessary to start and stop the main elevator to empty the temporary storage bin. By using my simple portable dumping apparatus, many different bins, or sinks A can be conveniently used to receive large quantities of grain of different grades, and the expense of frequently operating the main grain elevator is thus eliminated.

The wheel seats 13 are associated with the hoisting device to provide a brake for preventing accidental displacement of the dumping apparatus. When these wheel seats firmly engage the floor of the driveway, they prevent displacement of the wheeled carriage, and the vehicle wheels will pass freely over the inclined top faces of these wheel seats, without displacing the hoisting device carriage. After passing over one of the wheel seats 13, the front wheels W (Figs. I and III) contact with the driveway at points between the wheel seats, and when said seats are elevated, the hoisting device carriage will adjust itself to properly locate the wheel seats in engagement with the treads of wheels W.

The elongated wheel seats 13, arranged transversely of the driveway, are adapted to receive vehicle wheels of any gauge, either wide or narrow, and a vehicle of any length may be properly unloaded by the portable dumping apparatus. Furthermore, the vehicle to be dumped may enter from either side of the apparatus which is open at both sides to receive the front of the vehicle, and when the vehicle is in either position, the wheel carriage will be properly shifted during the dumping operation to compensate for the arcuate movement of the front portion of the vehicle.

I claim:

1. In a vehicle dumping apparatus, a carriage having side members separated from each other to provide a space for the front portion of the vehicle, wheel-seats connecting said side members, said wheel-seats being movable to the lower portion of said space to receive the front wheels of the vehicle, vertical guides whereby said wheel-seats are guided, said wheel-seats being provided with laterally and longitudinally disposed anti-friction rollers bearing against said vertical guides and a hoisting device whereby said wheel-seats are lifted to tilt the vehicle, said hoisting device, vertical guides and wheel-seats being supported by said carriage.

2. In a vehicle dumping apparatus, a carriage having side members separated from each other to provide a space for the front portion of the vehicle, connecting means whereby said side members are united, said connecting means being located at the bottom of said space to allow the vehicle wheels to pass over said connecting means, wheel-seats, said wheel-seats forming a bridge over said connecting means when said wheel-seats are in their lowermost positions, said wheel-seats being adapted to receive the front wheels of the vehicle, and a hoisting device whereby said wheel-seats are lifted to tilt the vehicle, said hoisting device and wheel-seats being supported by said carriage.

3. In a vehicle dumping apparatus, seats for the front wheels of the vehicle, a hoisting device whereby said seats are elevated to tilt the vehicle, and a carriage supporting said seats and hoisting device, the wheel seats being approximately U-shaped in cross section and the bottom faces of said seats being adapted to frictionally engage the driveway to prevent accidental displacement of said carriage.

4. In a vehicle dumping apparatus, a carriage having side members separated from each other to provide a space for the front portion of the vehicle, connecting means whereby said side members are united, wheel-seats for the front wheels of the vehicle, hoisting devices comprising air cylinders one of which is located adjacent to each side member of the carriage, a piston operable in each of said cylinders, each of said pistons being provided with a piston rod, and depending hangers connecting said piston rods and said wheel-seats, vertical guides forming parts of the side members of the carriage, and thrust members connecting said wheel-seats and said vertical guides whereby said carriage may be moved horizontally in response to vertical movements of said wheel-seats, so as to permit said wheel-seats and the vehicle wheels thereon to move upwardly in an arc of a circle.

In testimony that I claim the foregoing I hereunto affix my signature.

RICHARD C. STONE.